United States Patent [19]

Seymour et al.

[11] Patent Number: 5,358,554
[45] Date of Patent: Oct. 25, 1994

US005358554A

[54] LIQUID COMPOSITION FOR IMPROVING STRENGTH AND WATER REPELLENCY OF CAST CELLULOSIC FIBER PRODUCTS

[75] Inventors: Kevin M. Seymour, Toronto; Desmond G. Seymour, Victoria, both of Canada

[73] Assignee: 753541 Ontario Inc., Don Mills, Canada

[21] Appl. No.: 180,278

[22] Filed: Jan. 12, 1994

Related U.S. Application Data

[63] Continuation-in-part of Ser. No. 52,921, Apr. 27, 1993, abandoned.

[51] Int. Cl.$^5$ .............................. C04B 12/04
[52] U.S. Cl. ....................... 106/2; 106/622; 106/271; 106/287.1
[58] Field of Search ............... 106/2, 622, 271, 287.1; 427/416, 442, 443

[56] References Cited

U.S. PATENT DOCUMENTS

| | | | |
|---|---|---|---|
| 1,953,085 | 4/1934 | Manson | 106/622 |
| 2,199,862 | 5/1940 | Strovink | 427/416 |
| 4,038,224 | 7/1977 | Eisenmenger et al. | 106/271 |
| 4,277,355 | 7/1981 | Farcnik | 106/622 |

OTHER PUBLICATIONS

Hercules Canada Inc., "Material Safety Date Sheet, PARACOL ® 404 Series, 447K, 802 Series" Mar. 28, 1991, 4 pages.
Hercules Canada Inc., "Product Data PARACOL 404A Wax Emulsion C104–1", 2 pages, dated Apr., 1993.
Hercules incorporated "Product Data, PARACOL ® 404N Wax Emulsion, No. 7045–4" 2 pgs, dated Apr., 1993.

*Primary Examiner*—Karl Group
*Assistant Examiner*—C. M. Bonner
*Attorney, Agent, or Firm*—Ridout & Maybee

[57] ABSTRACT

Paraffin wax emulsion is combined with alkali metal silicate solution to form a stable liquid mixture conferring increased strength and water repellency when applied to cellulosic fiber mat products such as paper and paperboard. This product can be varied in application levels and component ratios such that strength and hydrophobicity and recyclability can be optimized, depending on the final product requirements.

24 Claims, No Drawings

LIQUID COMPOSITION FOR IMPROVING STRENGTH AND WATER REPELLENCY OF CAST CELLULOSIC FIBER PRODUCTS

This application is a continuation in part of application Ser. No. 08/052,921 filed Apr. 27, 1993, now abandoned.

The invention relates to liquid compositions and more especially but not exclusively to compositions for application to cast cellulosic fiber mats.

Paper, paperboard and other cellulosic fiber mats are usually manufactured by forming an aqueous slurry of cellulose fibres, casting the slurry as an aqueous layer and drying the layer through a combination of vacuum, pressure and heat.

Those skilled in the art know the value of long, flexible, softwood fibres in creating strength properties needed for such applications as boxboard and packaging.

The recent ecological trends of reuse and better and more complete forest utilization have led to the use of more recycled waste fibres and increased use of shorter, stiffer, hardwood fibres. As a consequence, strength properties of the cellulosic mat products have decreased. One solution to the problem is to provide addition of increased softwood or chemical pulps to balance the weaker fibres but this is not always convenient. An alternative is to provide a chemical modification which results in property upgrading.

The strength properties of paper and paperboard most of concern traditionally have been burst, tear, tensile and fibre bonding. Recently, ring crush strength has become important. Additionally, chemical resistance (to water, salt, oil) have gained in importance. At the same time the usual chemical modifiers such as acrylates, acrylamides and starches have failed to completely meet these requirements, as well as significantly increasing paper and paperboard costs.

Silicates when applied in paper and paperboard manufacture are very successful in providing the desired ring crush strength properties that are highly valued in, for example, boxboard manufacturing. Silicates however have very poor sensitivity to water, and application of silicates in the manufacture of cellulosic fiber products such as paper and paperboard render the products undesirably water absorptive. Many additives such as waxes, oils, silicones, stearates and fluorocarbons would appear at first sight to be candidates for application in admixture with silicate to alleviate the water absorption problem. However these additives are widely considered to be unusable since when used with silicates they present such problems as incompatibility with the silicates, interference with fiber bonding, high costs, reduction of the strength properties, and undesirable rheological properties of the mixture.

The applicants have now found in accordance with the invention that paraffin wax emulsion can be mixed in substantial quantities with alkali metal silicate solution to form mixtures that are surprisingly stable and are readily applied in the manufacture of cast cellulosic fiber or to the surface of dried product mats. Surprisingly, it has been found that these mixtures impart excellent and controllable water repellency and highly advantageous strength properties, in particular high ring crush strength and high fiber bond in corrugating medium linerboard and other products to which they are applied. Moreover, the treatment does not significantly affect the recyclability and repulpability of the products, or their printability.

Paraffin wax emulsions are in themselves well known and are commercially available. Typical uses are in the paper and paperboard industry by applying them alone or in combination with starches or gums to impart or improve water repellency. Preferred emulsions for use in the present invention comprise a dispersion of finely divided paraffin wax particles with an average particle size in the range about 0.5 to about 10 microns, more preferably about 1 to about 2 microns, in an aqueous base which may contain minute or trace quantities of a dispersing agent such as a soap or surfactant. Preferred emulsions have a total solids weight in the range about 30 to about 60, more preferably about 40 to about 55, weight percent, and have a wax melting point within the range of about 45 to about 60° C., more preferably about 50 to about 55° C.

Preferred examples of wax emulsions include PARACOL (trademark) 404A and 404N wax emulsions, available from Hercules Canada Inc., Mississauga, Ontario, but the invention is by no means limited to these preferred materials.

The alkali metal silicates employed in the present invention may be represented generally by the formula

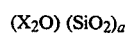

$$(X_2O)(SiO_2)_a$$

where X is an alkali metal such as sodium or potassium.

Most commonly the preferred alkali metal silicate is that of sodium in which the ratio of silica to sodium oxide ("a" in the formula above) is usually anywhere between 0.5 and 3.5.

As discussed in more detail below, in certain instances it may be desirable to employ a lithium-modified silicate wherein a part of the alkali metal atom X content is replaced by Li.

As will be appreciated, the liquid treatment composition in accordance with the invention obtained by blending a paraffin wax emulsion with the silicate solution will comprise in its essentials finely divided paraffin wax, alkali metal silicate and water. Various methods of making the composition are contemplated, for example paraffin wax may be dispersed directly in alkali metal silicate solution. Preferably, in order to impart advantageous water repellent properties to the cellulosic fibre products, the composition comprises at least about 0.05% paraffin wax (dry solids) based on the total weight of the composition (all percentages herein are by weight based on the total weight of the composition unless otherwise indicated). Utilization of contents of wax greater than about 25% may lead to problems of instability of the composition and tend to increase costs without corresponding increase in water repellency. As will be appreciated, the wax content may be varied by varying the proportion of a paraffin wax emulsion blended with a silicate solution. It has been found that the water repellency can be controlled within wide limits by varying the content of the wax component. This is highly advantageous for tailoring the water repellency to suit particular end products or uses. For example corrugating medium (paper), which is to be glued requires low water repellency or phobicity while linerboard, which needs liquid water resistance, needs higher repellency. Boxboard, for example, for some applications such as pizza trays, requires very high oil and water resistance which can be achieved with compositions in accordance with the invention having relatively elevated wax solids contents. Preferably, the content of paraffin wax is less than about 15%, more preferably about 0.25% to about 10%, still more preferably about 0.25% to about 6%.

Preferably, in order to achieve satisfactory strength properties in cellulosic products to which the composition is applied, the liquid composition comprises at least about 10% alkali metal silicate (dry solids basis). Preferably to avoid excessively high viscosities in the composition and instability, the content of the silicate is not typically higher than about 50%. More preferably, the silicate content is about 25 to about 40%, still more preferably about 30 to about 35%. Preferably, the composition comprises about 40 to about 80% water.

Preferred compositions in accordance with the invention have weight ratios of silicate (dry solids basis) to wax (wax solids) of from about 3:1 to about 850:1 and a concentration of silicate (dry solids) plus water of about 60% to about 99.9%. If the ratio of silicate:wax is significantly less than about 3:1, the compositions tend to be excessively expensive due to their high content of wax, and will tend to be unstable, and will offer difficulties of runability and application. Further, the resulting cellulosic mats will tend to be glossy, to have poor gluability and be difficult to recycle. If the ratio is significantly greater than 850:1, the water repellency imparted to the cast cellulosic mats tends to be insufficient owing to the low wax contents. More preferably the said weight ratio is about 5:1 to about 40:1, even more preferably about 5:1 to about 30:1.

The preferred compositions are free from, or have low contents of, non-wax solids such as inert fillers or the like. Preferably, as noted above, the concentration of dissolved silicate solids plus water is at least about 60%. Compositions which have a concentration of water plus silicate significantly less than about 60% tend to have a high content of inert solids such as inorganic fillers and offer difficulties of maintaining the solids in suspension and of application and runability. More preferably, the concentration of dissolved silicate solids plus water is about 75% to about 99.9%, still more preferably about 80 % to about 99.9%.

In order to facilitate forming a stable mixture without kickout, flocculation or gelling of the emulsion, the composition is preferably formed by agitating an aqueous alkali metal silicate solution, and blending an aqueous paraffin wax emulsion into the silicate solution while the latter is maintained agitated. Preferably the agitation is intensive and provides high shear forces, and preferably is applied by a high speed propeller or other rotary mechanical mixer device.

Surfactants may be added to the composition in order to increase the wettability of the substrate to which the composition is applied and the penetration of the composition into the substrate.

As will be appreciated, it is highly desirable for present purposes that the liquid composition should be capable of maintaining a sufficiently homogeneous consistency to allow it to be applied by conventional application techniques such as spraying, brushing or rolling during cellulosic fibre product manufacture. Surprisingly, it has been found that paraffin wax can be mixed with the silicate solutions to achieve mixtures having adequate stability for these purposes. In prolonged storage, or during shipping to an end user, the composition may settle out into two or more phases. However, the settled-out mixture can readily be remixed using conventional stirrers to re-form a homogeneous composition.

It may in some case be desirable to maintain the silicate solution at above room temperature while conducting the mixing to reduce problems of kickout, flocculation or gelling. In such cases desirably the silicate solution is heated to a temperature usually above about 20° C. and up to about 2° C. less than the melting point of the wax before addition of a wax emulsion. Excessively high temperatures may cause the wax to melt and agglomerate or separate.

Where the hydrophobic additive such as wax leads to problems such as kickout, flocculation or gelling during the mixing procedure, it has been found that formation of a homogeneous mixture can be facilitated by using a lithium-substituted alkali metal silicate. In such case, the level of lithium substitution is preferably about 0.01 to about 5% lithium by weight based on the weight of alkali metal silicate. Without wishing to be bound by any theory, it appears the lithium functions as a hydrotrope, promoting the formation and stabilization of an homogeneous mixture.

In use, the liquid composition of the invention in the preferred form is applied to the surface of the cast cellulose fibre layer product, such as paper or paperboard. The liquid composition may be applied using techniques and apparatus conventionally used for application of liquid surface-modifying additives during paper or paperboard manufacture. Exemplary methods of application include spraying, application rolls, blade coating, curtain coating and size pressing. Such techniques and apparatus are well known to those skilled in the art, form no part of the present invention and need not be described in detail herein. For example, the composition may be applied to the product such as paper or paperboard during manufacture and before or more preferably after the product is dried. For example, it may be sprayed onto the paper product on the wire of a conventional paper making machine before the dryer section. The application rates or coating weight needed to achieve a desired degree of water repellency and of strength in the case of any given product can be readily determined by those skilled in the art using routine trial and experiment and may of course vary considerably depending on the intended end use of the cellulosic fibre product. For example, typically in the case of a surface spray of the composition applied to the top surface of a hardwood corrugating medium, the coating weight may be about 0.1% by weight to about 33% by weight of the whole composition based on the weight of the dry medium. After application of the composition, the medium is dried or is allowed to dry.

It may be mentioned that among the advantages of the invention during manufacture of cast cellulosic fiber mat products such as paper and paperboard in the preferred form are the following:

1. Very high oil repellency is achieved.
2. High water repellency is achieved.
3. High ring crush strengths are achieved.
4. Excellent surface fiber bonding is achieved.
5. The minimal wax content tends to flexibilize or plasticize the silicate, avoiding the tendency of the product to brittleness as is the case with applications of silicate alone.
6. The composition is readily sprayable with greatly reduced tendency for the silicate solution to skin over or block the spray nozzles.

7. There are good properties of release of the paper or other product from the mat forming apparatus such as wire in the dryer section, and the product does not block in the paper rolls.

The composition with or without the addition of acrylics and/or surfactants may also usefully be applied to substrates other than cast cellulosic materials, such as to masonry and wood particle board, in order to impart water resistance. It is considered that the hydrophobicity of the compositions provides beneficial results when employed in applications such as paints (silicate-acrylic architectural finishes), masonry finishes, and waterproofing slurries.

Although the above description provides ample information to enable one of ordinary skill in the art to make and use the liquid composition of the invention and to apply the liquid composition in treatment of, for example, cast cellulosic mats such as in paper manufacture, for the avoidance of doubt some detailed Examples will be given.

EXAMPLES

Example 1

The following Table 1 illustrates the surprising stability of silicate containing mixtures formed with paraffin wax emulsions as compared with the instability of comparable mixtures formed with various known additives conventionally used in paper-making, including various water repelling agents, such as non-paraffin wax emulsions, oils and like organics.

In each case 2% by weight of the additive (based on the total weight of the mixture) was added to a standard sodium silicate solution and was mixed well. The silicate solution was National Silicates "N" available from National Silicates, Toronto, Canada and comprises a 38% solution (dry solids basis) of $(Na_2O).(SiO_2)_{3.22}$. After standing for 30 mins. the stability of the mixture was determined by visually examining it for kickout, flocculation and gelling.

TABLE 1

| Additive | Type | Source | Stability |
|---|---|---|---|
| Non-parraffin wax products | | | |
| FC 807,803 | Fluorocarbon | 3M | Unstable |
| Paint additive 44, 57 | Silicone | Dow | " |
| BASOPHOB ® 3343 | Wax emulsion | BASF | " |
| ALCOLUBE ® CRT40, GYO | Wax/Oil | Allied Colloids | " |
| ALCOLUBE ® PKL | Cationic wax | Allied Colloids | " |
| GLASWAX ® E1 | Oil/wax | Allied Colloids | " |
| Emulsion 65935 | Wax emulsion | Michelman | " |
| MICHELUBE ® 743 | Wax/oil emulsion | " | " |
| ALCOLUBE ® 241 | Oil-like repellent | Allied Colloids | Stable[1] |
| Paraffin wax product | | | |
| PARACOL ® 404N | Paraffin wax | Hercules | Stable (borderline) |

Note 1. This additive produces unacceptably high water absorptivity and is unsuitable for present purposes.
Note: PARACOL ® 404N wax emulsion comprises 47% by weight paraffin wax solids of average particle size 1.0 microns.

Example 2

In this Example various methods of blending of PARACOL 404N with silicate solutions were used. Similar stirring conditions and similar proportions of wax emulsion to silicate solution were used in each case.

Table 2 shows the results achieved.

TABLE 2

| Ex. No. | Method | Result |
|---|---|---|
| 2a | Sodium silicate[1] added to PARACOL before stirring | Kickout |
| 2b | Sodium silicate[1] added to PARACOL while stirring | Flocculation |
| 2c | Lithium modified[2] silicate added to PARACOL while stirring | Flocculation |
| 2d | PARACOL added before agitation to sodium silicate[1] | Kickout |
| 2e | PARACOL added before agitation to lithium silicate[2] | Lightly Flocculated |
| 2f | PARACOL added during stirring to sodium silicate[1] | Stable |
| 2g | PARACOL added during stirring to lithium silicate[2] | Very Stable |
| 2h | PARACOL added during stirring to warm sodium silicate | Very Stable |

Notes:
[1]Sodium silicate "N" as used in Example 1.
[2]Lithium modified sodium silicate "N" obtained from National Silicates, Toronto, Canada The results indicated improved stability is achieved when the wax emulsion is added to warm silicate solutions, and lithium modification improves stability. It was found that the lithium modification did not detract from water resistance, but the lithium modified material is significantly more expensive.

Example 3

The effects of varying contents of lithium in the silicate were examined. In each case mixtures were formed in a similar manner by adding 12% (whole emulsion) by weight PARACOL 404N (based on the weight of the final mixture) to a silicate solution during agitation. The silicate solutions were prepared by mixing sodium silicate N solution, as used in Example 1 with varying proportions of lithium-substituted sodium silicate solutions. In Table 3 below the percentages by weight of lithium-substituted solution and of sodium silicate N solution are indicated based on the weight of the mixed silicate solution.

In Table 3 "N-Li-2" indicates a solution similar to sodium silicate N solution except it contains, on a dry solids basis by weight 98% sodium silicate N $((Na_2O).(SiO_2)_{3.22})$ and 2% $LiOH.H_2O$. "N-Li-3", N-Li-4" and "N-Li-5" indicate 3%, 4% and 5% $LiOH.H_2O$, respectively.

The stability of the resulting mixtures was in each case good and the mixtures were applied to a dry paper product during manufacture. The water repellency of the dry final product was assessed.

The results are as indicated in Table 3.

TABLE 3

| Example No. | Silicate Solution/ | Sodium Silicate N | Stability | Water Repellency |
|---|---|---|---|---|
| 3a | N-Li-2 | 100%/0% | Good | Good |
| 3b | N-Li-2 | 50%/50% | " | " |
| 3c | N-Li-3 | 25%/75% | " | " |
| 3d | N-Li-4 | 25%/75% | " | " |
| 3e | N-Li-5 | 25%/75% | " | " |
| 3f | — | 0%/100% | " | " |

The results indicated that use of lithium-modification conferred good stability without impairing water repellency. However, provided the wax emulsion is added to non-lithium modified silicate under sufficiently intensive agitation sufficient stability and excellent water repellency can be achieved, without incurring the costs of lithium modification.

Example 4

The effects of various mixing techniques were investigated. In each case PARACOL 404N was added, in an amount yielding a content of PARACOL emulsion of 7% by weight (whole emulsion) in the final mixture, to standard sodium silicate N solution as used in Example 1, and the stability was examined. The results are shown in Table 4.

TABLE 4

| Example No. | Mixing Procedure | Stability assessed visually after 30 mins |
|---|---|---|
| 4a | Addition to 30° C. silicate solution while stirred with high speed shearing propeller blade | Excellent |
| 4b | Addition to room temp. silicate solution stirred with high speed shearing propeller blade | " |
| 4c | Addition to room temp. silicate solution stirred with low speed blending propeller blade | Good |
| 4d | Addition while hand stirring | Borderline |
| 4e | Addition followed by any agitation | Poor (Flocculation) |
| 4f | Addition without any mixing (slight sloshing) | Highly Flocculated |

The results showed that mechanical mixing may be necessary in most cases to obtain a stable mixture, and the stability improves with increasing mixing intensity. Mixing after combining the ingredients appeared to be inadequate for stability. Also, warm silicate solutions at 30° C. appeared advantageous in making a more stable blend.

Example 5

The effect of increasing wax concentration on stability was investigated. Table 5 below gives the amount of whole PARACOL 404N emulsion added to sodium silicate N solution, as used in Example 1, as a percentage by weight based on the weight of the final mixture. The respective mixtures were applied each in a similar fashion on a paper in the course of manufacture and the ring crush strength and water drop repellencies were compared.

Ring crush strength was measured using TAPPI Method T-822 (PM 84).

Water repellency was measured using TAPPI Method T-441 (OM-84). The water drop repellencies in Examples 5b to 5g are reported as the increase in time before total water drop absorption over the product of Example 5a which received no wax emulsion.

TABLE 5

| Example No. | Wax emulsion (%) | Stability | Ring Crush Strength | Water Drop Repellency |
|---|---|---|---|---|
| 5a | 0 | — | Excellent[1] | 1 min |
| 5b | 4 | Adequate[2] | " | >2 mins[3] |
| 5c | 10 | Good | " | >15 mins[3] |
| 5d | 12 | Very Good | " | >40 mins[3] |
| 5e | 15 | Excellent | " | >1 hour[3] |
| 5f | 20 | " | " | >1.5 hours[3] |

TABLE 5-continued

| Example No. | Wax emulsion (%) | Stability | Ring Crush Strength | Water Drop Repellency |
|---|---|---|---|---|
| 5g | 26 | " | " | >2 hours[3] |

Notes:
[1] All products had equal strength values. The Strength value was increased 50% ± 5% over the untreated paper product.
[2] It appeared visually that the mixture tended to be less stable if the addition of emulsion is less than about 4% based on the weight of the mixture.
[3] Increased times over Example 5a.

The results indicated that the wax modification did not impair silicate-induced strength in the paper product. Further, the stability of the mixture improved with increasing wax concentration and the water repellency could be controlled by controlling wax concentration.

Example 6

Stable liquid mixtures of PARACOL 404N with sodium silicate N solution, as used in Example 1, were formed and were applied in a standard fashion by surface spray to the top surface of a hardwood corrugating medium. Trials were conducted on a pilot scale and in an actual paper mill application. The results are indicated in Table 6 below. The wax content refers to the weight of whole PARACOL 404N emulsion in the mixture.

TABLE 6

| Example No. | Wax Content | Improved Ring[1] Crush | Improved Water[2] Resistance |
|---|---|---|---|
| 6a - pilot scale | 20% | 54% | >2 hr. |
| 6b - mill | 12% | >30% | >2 hr. |

Notes:
[1] The increased ring crush strengths as measured by TAPPI T-822 (PM 84) over the same product which received no liquid mixture.
[2] The increased water resistance as measured by TAPPI T-441 (OM - 84) over the same product which received no liquid mixture.

Example 7

When treated with wax for repellency (such as is needed in boxes for produce) the box boards coated with the wax/silicate blends were much more repulpable (i.e. recyclable) than common wax treated boards.

A comparison was made of the water repellency, relative repulpability and relative cost of untreated box board, conventional wax coated boxboard and box board coated with compositions in accordance with the invention comprising various blends of PARACOL 404N emulsion with sodium silicate "N" solution as used in Example 1. The ratios in Table 7 indicate the ratio by weight of whole emulsion mixed with the silicate solution.

TABLE 7

| | Relative Water[1] Repellency | Relative Repulpability[2] | Relative Cost[3] |
|---|---|---|---|
| Untreated boxboard | Low (unacceptable for produce & meats) | Excellent | Lowest |
| Wax coated boxboard | Excellent | Unacceptable | High |
| Boxboard coated with blends of wax emulsion/silicate solution: | | | |
| Ratio 5:95 | Borderline | Good | Low |
| Ratio 12:88 | Good | Good | Medium |

TABLE 7-continued

| | Relative Water[1] Repellency | Relative Repulpability[2] | Relative Cost[3] |
|---|---|---|---|
| Ratio 25:75 | Excellent | Good | Medium-high |

[1] See note 2, Example 6.
[2] 10 minutes in PFI mill, passed through paper fibre grading sieves.
[3] Noting cost of raw material, application levels, heat required for keeping conventional liquid wax flowing, specialized wax-application equipment, loss of recycling potential in waxed boards, and need for additional strength modifier when only using wax.

Example 8

Liquid compositions containing high and low wax contents were prepared and applied to corrugating medium in an amount sufficient to provide a dry coating weight (wax solids plus silicate solids) of 10%, based on the weight of the dry corrugating medium. The liquid compositions were evaluated for stability and the treated corrugated medium was evaluated for water repellency and for penetration of the composition into the core of the corrugating medium, with the results shown in Table 8.

TABLE 8

| Example No. | Content of wax emulsion[1] | Content of silicate[2] | Ratio of weight silicate:wax on dry basis | Stability | Water Repellency | Penetration into the core |
|---|---|---|---|---|---|---|
| 8a | 0.2% | 99.8% | 403:1 | good | low[4] | high[5] |
| 8b | 25.0% | 75.0% | 2.4:1 | good | high[4] | average[5] |
| 8c | 20.0% | 79%[3] | 3.2:1 | good | high[4] | high[5] |

Notes:
[1] Paracol 404A at 47% wax solids.
[2] Sodium silicate N solution at 38.0% solids.
[3] 1% dispersant (Pigment disperser A) added - Pigment disperser A is an ammonium polyacrylate dispersant obtainable from BASF Canada Inc., Toronto, Canada.
[4] Determined by relative water drop test on 10% treated corrugation medium: low = 1 minute; high = >3 minutes.
[5] Relative penetration of 10% solids into corrugation medium: high = none visible; average = some glossing.

The mixture of Example 8a is useful as a penetrating saturant where the primary goal is improved crush strength, and there is minimal concern for water repellency improvement.

The mixture of Example 8b is highly hydrophobic yet provides significant ring crush improvement as well. The average penetration into the core is a drawback, however.

The mixture of Example 8c is highly hydrophobic, provides high ring crush improvement and, by virtue of the added surfactant (1% pigment disperser) has desired penetration without sacrificing water resistance.

We claim:

1. A liquid composition comprising a dispersion of finely divided paraffin wax in an aqueous solution of alkali metal silicate wherein the weight ratio of said silicate to said wax is from about 3:1 to about 850:1, and the concentration of silicate plus water, based on the total weight of the composition is about 60% to about 99.9%.

2. A composition as claimed in claim 1 wherein said weight ratio is about 5:1 to about 40:1.

3. A composition as claimed in claim 2 wherein said weight ratio is about 5:1 to about 30:1.

4. A composition as claimed in claim 1 wherein said concentration is about 75% to about 99.9%.

5. A composition as claimed in claim 1 wherein said concentration is about 80% to about 99.9%.

6. A composition as claimed in claim 1 having a content of paraffin wax of about 0.1 to about 25% by weight based on the total weight of the composition.

7. A composition as claimed in claim 6 wherein said paraffin wax content is about 0.25% to about 10%.

8. A composition as claimed in claim 7 wherein the paraffin wax content is about 0.25% to about 6% by weight.

9. A composition as claimed in claim 1 having a content of alkali metal silicate (dry solids basis) of about 10 to about 50% based on the total weight of the composition.

10. A composition as claimed in claim 9 wherein the alkali metal silicate content is about 25 to about 40%.

11. A composition as claimed in claim 1 containing about 40 to about 80% water based on the total weight of the composition.

12. A composition as claimed in claim 1 wherein the paraffin wax has an average particle size of about 0.5 to about 10 microns.

13. A process for treating a cast cellulosic fiber mat, for increasing its strength and water repellency, comprising applying to the mat a composition comprising a dispersion of finely divided paraffin wax in an aqueous solution of alkali metal silicate, wherein the weight ratio of said silicate to said wax is about 3:1 to about 850:1 and the concentration of silicate plus water is about 60% to about 99.9%, based on the total weight of the composition.

14. A process as claimed in claim 13 wherein the mat is paper, paperboard, or liner board.

15. A process as claimed in claim 13 wherein the dispersion is applied after the mat is formed and before it is dried.

16. A process as claimed in claim 13 wherein the dispersion is applied after the mat is dried.

17. A process as claimed in claim 13 comprising applying about 0.1% to about 33% by weight of the whole dispersion based on the weight of the dry mat.

18. A process as claimed in claim 13 wherein said weight ratio is about 5:1 to about 40:1.

19. A process as claimed in claim 13 wherein said weight ratio is about 5:1 to about 30:1.

20. A process as claimed in claim 13 wherein said concentration is about 75% to about 99.75%.

21. A process as claimed in claim 13 wherein said concentration is about 80% to about 99.75%.

22. A process as claimed in claim 13 wherein said dispersion has a content of paraffin wax of about 0.1 to about 25% by weight based on the total weight of the dispersion.

23. A process as claimed in claim 22 wherein said paraffin wax content is about 0.25% to about 10%.

24. A process as claimed in claim 23 wherein the paraffin wax content is about 0.25% to about 6% by weight.

* * * * *